Sept. 26, 1939.                J. G. HAWLEY                2,174,243
                                  BRAKE
                          Filed Nov. 20, 1933
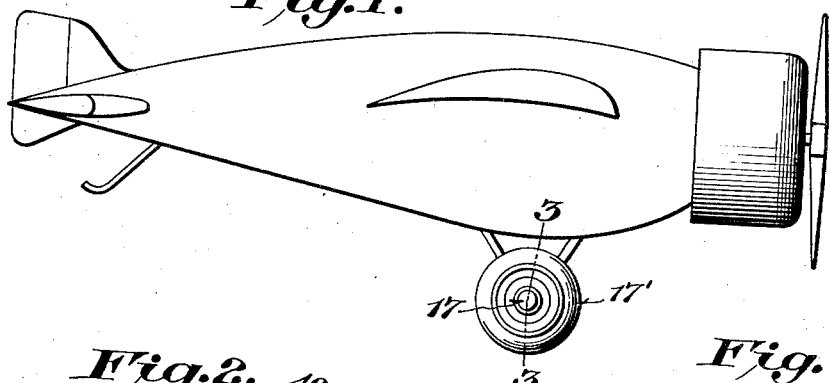
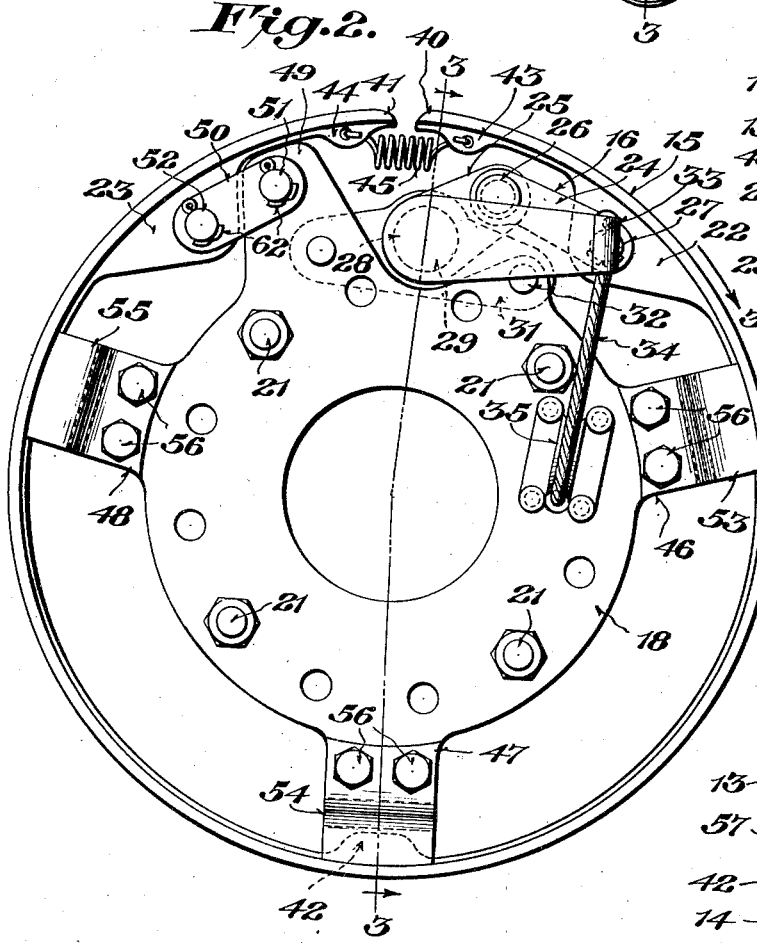
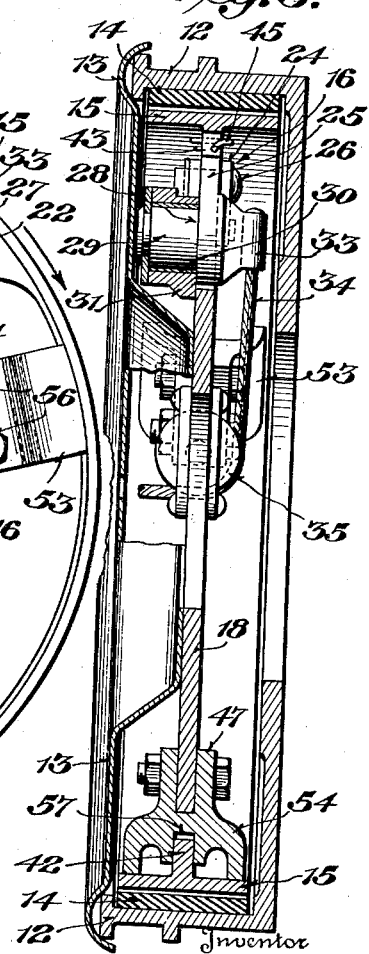
Jesse G. Hawley,
By Albert T. St Clair
Attorney.

Patented Sept. 26, 1939

2,174,243

UNITED STATES PATENT OFFICE 2,174,243

BRAKE

Jesse G. Hawley, Painted Post, N. Y., assignor to Hawley-Jones Corporation, Riverside, N. Y., a corporation of New York Application November 20, 1933, Serial No. 698,783

4 Claims. (Cl. 188—78)

This invention relates to the art of brakes, and more particularly to internally expanding brakes.

Prior brakes have generally been characterized by relatively complicated mechanism, including a fixed brake lining and a relatively fixed brake shoe, which resulted in overheating, improper centering of the brake sections, irregular wear on the brake lining, slow release, and difficult replacement of the brake lining.

My present invention, which is an improvement on the brake set forth and claimed in my Patent 2,098,660, is particularly adapted for airplane use and overcomes the above defects by providing a brake with a creeping brake lining and a full floating brake shoe provided with a special swinging anchor.

It is therefore an object of this invention to provide a new and improved brake.

It is another object to provide a brake with a full floating brake shoe and a creeping brake lining.

It is a further object to provide a brake in which a full floating expanding brake shoe has a special anchor.

With the above and other objects in view, which will be apparent as the description proceeds, I have set forth my invention in the following specification and have illustrated it in the accompanying drawing, in which:

Figure 1 is a side view of an airplane embodying my invention;

Fig. 2 is a side elevation of my brake shoe and its related parts; and

Fig. 3 is a vertical transverse section, on the lines 3—3 of Figs. 1 and 2, showing the brake shoe and related parts arranged in position in the brake drum, and with the brake cover in position.

Referring to the accompanying drawing, and particularly to Figs. 2 and 3, my brake preferably comprises a drum 12, a fixed brake cover 13, a creeping brake lining 14, a full floating brake shoe 15, and a toggle 16 for expanding the brake shoe into contact with the brake lining when the brake is to be applied, and for withdrawing it therefrom immediately upon releasing the brake.

In the embodiment of my invention shown herein, which is particularly adapted for use on airplane wheels, although it is not limited thereto, the drum 12 is preferably carried by the hub 17 of the wheel 17'.

My brake shoe 15 is mounted so as to have a full floating action by yieldingly connecting it with a spider 18, as described below, and the spider 18 and brake cover 13 are preferably bolted to the hub flange of an axle (not shown) by a plurality of bolts 21.

The drum 12 and its wheel are free to turn with respect to the spider 18 and the floating brake shoe 15.

The brake shoe 15 is provided with a pair of bosses 22 and 23, and the toggle 16 preferably comprises a pair of toggle links 24 and 25 which are connected by a pivot pin 26. The opposite end of link 24 is pivoted at 27 to boss 22, and the opposite end of link 25 is pivoted at 28 to a rotatable toggle operating stud 29, housed in a bearing 30 carried by a plate 31 that is secured to the spider 18, as by the rivets 32. The toggle operating stud 29 is connected with any suitable brake actuating means, as an operating lever 33, to the end of which is attached an operating cable 34 that passes over a pulley 35 mounted on the spider 18.

My floating brake shoe 15 preferably comprises a single flexible band with spaced rounded ends 40 and 41, the rounding serving to prevent gouging of the brake lining 14. I prefer to make the brake shoe of cast iron, although it can be made of spring steel or other flexible metals. I also prefer to make it of substantially flat cross section.

It is a particular point of my invention that the brake shoe is flexible throughout substantially its whole length and, to facilitate this, I prefer to make it of uniform cross section except for the bosses 22 and 23 and a similar boss 42 arranged at some intermediate point, which is shown as the midway point in Figs. 2 and 3, and two small lugs 43 and 44 near the ends 40 and 41 to receive a retracting spring 45.

The spider 18 is preferably a substantially circular steel plate provided with projections 46, 47 and 48, arranged at substantially equal intervals around its circumference, and a projecting arm 49. The latter is connected to boss 23 by a link 50, pivoted at 51 and 52 to the arm 49 and boss 23, respectively.

Projections 46, 47, and 48 are adapted to receive spacing members 53, 54, and 55, respectively, that are secured thereto by bolts 56, spacing members 53, 54, and 55 being disposed in proximity to the brake shoe 15 to prevent its undue retraction in the periods during which the brakes are not being applied. Furthermore, this construction prevents substantial contact between the shoe and lining, except when the brake is applied, by maintaining the circular shape of the brake shoe and thus preventing it from having more than a predetermined sidewise movement.

As shown, the spacing member 54 is different from spacing members 53 and 55, by being centrally slotted at 57 to receive the boss 42 which forms a sliding guide for the spider 18.

The various pivot pins 26, 51, and 52 are of any suitable type but may conveniently be perforated at one or both ends to receive cotter pins 62.

When it is desired to apply the brake, with the drum 12 turning in the direction of the arrow in Fig. 2, the operator pulls on the operating cable 34, which rotates the toggle operating stud 29 and causes the links 24 and 25 to straighten, thus forcing the end 40 of brake shoe 15 outwardly, against the pressure of spring 45. This causes the end 40 to engage the brake lining and press it into contact with the drum. The pressure thus exerted against the brake shoe is increased by a wrapping action on the portion of the shoe between the end 40 and the boss 23, which causes the entire brake shoe to engage the brake lining and press it into contact with the drum.

Upon the release of the brake operating means, spring 45 pulls the end 40 of the brake shoe 15 toward the end 41, releasing the toggle and rotating the stud 29 and operating lever 33 in the opposite direction, thus withdrawing the entire brake shoe from contact with the brake lining 14, and allowing the brake drum to turn freely about the brake shoe.

Since this brake is intended primarily for use on airplanes, it is only operable in one direction, namely, the direction in which the airplane is travelling forward.

The entire brake shoe 15, being made of resilient material and only being anchored at the pivots 27 and 52, has a tendency when released to disengage its entire surface from the brake lining because of the above characteristics and its free floating nature. In other words, when pressure upon the toggle is released, there is nothing to maintain engagement or braking action as the whole shoe simply contracts.

Furthermore, since the brake shoe is preferably a single floating member and the brake lining is not secured to it, the characteristic clinging action of previous brakes is avoided and a quick positive release is secured. This eliminates the pronounced chattering of previous brakes when they are applied lightly, and the grabbing when they are applied quickly or savagely, and produces a smooth velvety braking action.

By being mounted in this manner the floating brake shoe will correct any slight off-center relation between the brake drum and the axle and prevent the characteristic ridging of the interior of the brake drum, which is the usual, if not universal, accompaniment of the use of a fixed brake shoe.

It is also a special feature of my invention to provide a brake with a creeping brake lining 14 which is free to creep or float in the space between the brake shoe 15 and the drum 12 during the periods between applications of the brake and while the brake is being applied or released. By providing a creeping brake lining, I avoid the overheating and the tendency to secure braking with the same zone of the brake lining at all times which are inherent in a brake having a fixed brake lining.

The creeping brake lining 14 is of any suitable type, such as the usual asbestos brake lining, but is preferably made by interweaving zinc wire therethru to serve as a convenient heat transmitting medium, in order that the heat generated between the shoe and the lining, in applying the brake, may be transmitted to and thru the drum, and dissipated into the atmosphere.

From the above discussion it will be apparent that I have provided a new and improved brake which can be manufactured largely by stamping processes, and is simple in construction and efficient in operation. The brake drum 12 may be of pressed steel or cast iron. The toggle links and operating links may be varied in construction and single or double members may be used.

It will also be apparent that, by means of my floating brake shoe 15, I am able to correct the almost inevitable eccentricity of the mounting of the brake shoe with respect to the brake drum and to secure a quick release of the brake, and that, by virtue of the creeping brake lining, I not only eliminate the difficulty of originally installing as well as of replacing brake linings, but the wear resulting from the application of the brake is distributed over the entire area of the brake lining instead of being limited to certain portions thereof, and that this also accomplishes the highly valuable adjunct of eliminating overheating.

It is a further point of my invention that the boss 23 can be placed at any desired position around the circumference of the brake in order to secure the desired energizing action, and the further it is displaced, in the direction of wrap, the greater will be the braking power secured. The shape of the spider would, of course, be changed accordingly in order to provide an arm 49 in proximity to the boss 23.

Although I have herein disclosed a toggle operated brake, it will be apparent that the toggle mechanism can be replaced by other mechanisms, and I, therefore, desire to claim broadly an airplane brake having a full floating brake shoe and/or a creeping brake lining, as well as the various features of construction specifically disclosed herein.

As many apparently widely different embodiments of this invention may be made without departing from the spirit thereof, it is to be understood that I do not limit myself to the foregoing embodiments or description except as indicated in the following patent claims.

I claim:

1. In a brake, the combination of a brake shoe provided with a boss near each end thereof, a fixed spider, a toggle connecting the spider and one of said bosses, a pivoted link connecting said spider with said other boss, and a plurality of spaced means carried by the spider for preventing undue contraction of the shoe.

2. In a brake, the combination of a brake shoe provided with a boss near each end thereof, a fixed spider, a toggle connecting the spider and one of said bosses, a pivoted link connecting said spider with said other boss, a plurality of spaced means carried by the spider for preventing undue contraction of the shoe, and means for maintaining the spider in lateral alignment with the brake shoe without restricting rotary movement therebetween.

3. A one way operating airplane brake, comprising a drum, a full floating non-continuous one-piece brake shoe for cooperation therewith, a creeping brake lining therebetween, a fixed spider wholly within the outline of the brake shoe, and means for pivotally and positively connecting the spider with both ends of the brake shoe, one of said means being a toggle mechanism for applying and retracting the brake, and the other pivotal connection being a swinging link.

4. A one way operating airplane brake, comprising a drum, a full floating non-continuous one-piece brake shoe for cooperation therewith, a creeping brake lining therebetween, a fixed spider wholly within the outline of the brake shoe, means for pivotally and positively connecting the spider with both ends of the brake shoe, one of said means being a toggle mechanism for applying and retracting the brake and the other pivotal connection being a swinging link, and resilient means for normally pulling the ends of the brake shoe together.

JESSE G. HAWLEY.